(No Model.)
T. A. LATHROP.
FEED WATER HEATER AND FILTER.
No. 317,806. Patented May 12, 1885.
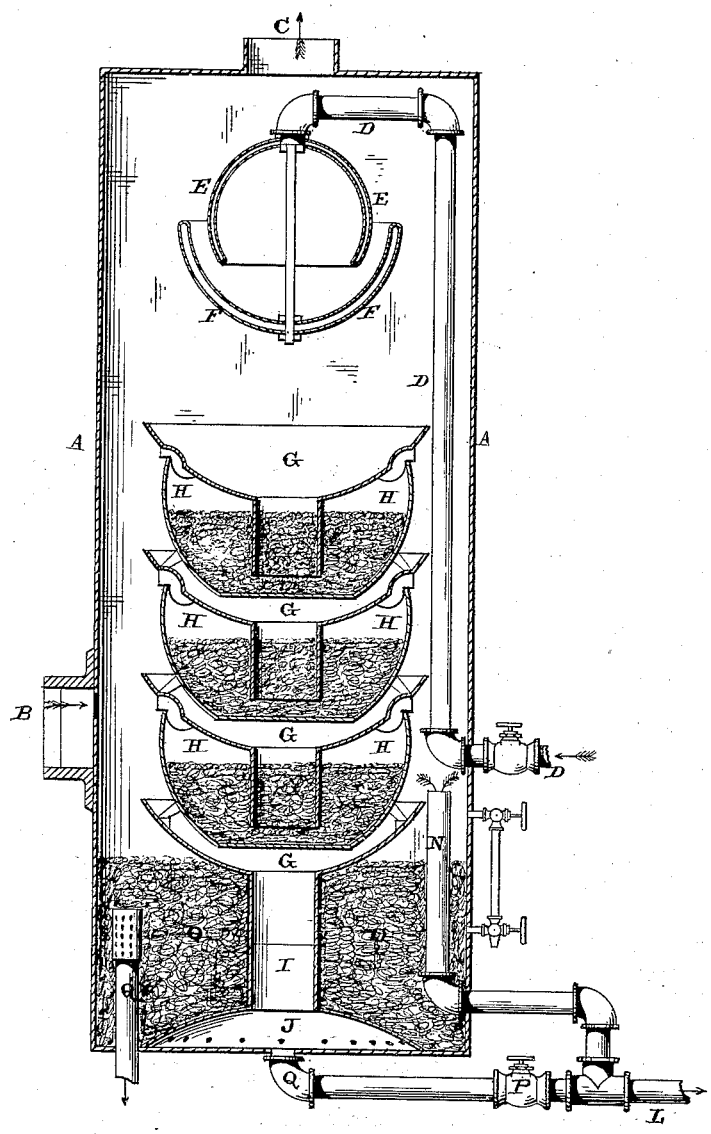
Witnesses.
L. F. Gardner
J. E. Prosperi
Inventor.
Thos. A. Lathrop,
per
J. A. Lehmann,
Atty.

UNITED STATES PATENT OFFICE.

THOMAS A. LATHROP, OF CANTON, OHIO, ASSIGNOR OF ONE-HALF TO H. T. WARNER, OF SAME PLACE.

FEED-WATER HEATER AND FILTER.

SPECIFICATION forming part of Letters Patent No. 317,806, dated May 12, 1885.

Application filed February 10, 1885. (No model.)

*To all whom it may concern:*

Be it known that I, T. A. LATHROP, of Canton, in the county of Stark and State of Ohio, have invented certain new and useful Improvements in Feed-Water Heaters and Filters; and I do hereby declare the following to be a full, clear, and exact description of the invention, such as will enable others skilled in the art to which it pertains to make and use it, reference being had to the accompanying drawing, which forms part of this specification.

My invention relates to an improvement in feed-water filters and heaters; and it consists, first, in the combination of a series of funnels and bowls placed alternately one above the other, the bowls being filled with any suitable filtering material, as will be more fully described hereinafter; and, second, in the arrangement and combination of parts, which will be more fully described hereinafter.

The object of my invention is to heat the feed-water by the exhaust-steam during its passage through the casing and to filter the water by conducting it down to the bottoms of the bowls, filled with suitable filtering material, and causing it to rise through the filtering material.

The accompanying drawing represents a vertical section of an apparatus embodying my invention.

A represents the casing, which will be made of any desired shape, size, or construction that may be preferred, and which has the exhaust-steam connected to it at the point B. This exhaust-steam rises through the casing and escapes at the point C, heating the inflowing feed-water in its passage through. The feed-water enters the side of the casing through the inlet-pipe D, which has the double shell or ball E on its end for the purpose of breaking the inflowing water up into a thin stream, so that it will become more easily heated. The water escapes from the lower edge of the ball either in a series of small jets or in one continuous stream. Secured just under the ball is the bowl F, into which the water is discharged, and from the edges of which the water flows in thin streams into the funnel below, the water becoming heated in its downward passage by the exhaust-steam that is rising up through the casing. Directly under the bowl F are a series of funnels and bowls, which are placed alternately one above the other, and through which the feed-water is made to pass for the purpose of being filtered. Each funnel G conducts the water to the bottom of the bowl H just under it, and the water rises up through the filtering material, of any suitable kind, with which the bowl is filled, and then flows over the edge of the bowl into the funnel below. Each funnel is supported in position above its respective bowl by means of suitable feet, which catch upon the edge of the bowl below, and each bowl is supported by feet which rest inside of the funnel below it. The water is made to rise through the filtering material, as above described, for the purpose of causing it to become more perfectly filtered than is likely to be the case where the water is allowed to percolate downward in the usual manner. The edge of each funnel extends out beyond the edge of the bowl below it, and each funnel serves to catch and hold any surplus water until it has time to pass through the filtering material. To the under side of the lowest funnel is connected the pipe I, and to the bottom of this pipe is secured the inverted funnel J, which is made removable from the pipe, and which has a series of holes made through its lower edges for the filtered water to pass through to the exhaust-pipe Q. The lower end of the casing is filled with any suitable filtering material to any desired depth, and which is packed around the funnel J, as shown. The overflow-pipe N extends up above this filtering material O, and is connected to the pipe L, outside of the casing, as shown, in which pipe L is placed the stop-cock P, as shown, so that the discharge of water from the bottom of the casing can be controlled at will. The water which flows to the boiler passes off through the perforated pipe Q', which has its end raised a suitable distance above the end of the casing, so that only the purest water will pass through it. The end of the pipe L opens under the funnel J, and into the end of this pipe will settle any muddy or impure water, and from which it can be drawn off at any time by opening the stop-cock. This pipe can also be used to drain all of the water out of the casing at any time.

Having thus described my invention, I claim—

1. The combination of the casing, the funnels, and the bowls filled with filtering material, substantially as set forth.

2. The combination of the casing, the funnels, the bowls filled with filtering material, the pipe I, the funnel J, the filtering material placed in the bottom of the casing, and the overflow and escape pipes, substantially as described.

In testimony whereof I affix my signature in presence of two witnesses.

THOMAS A. LATHROP.

Witnesses:
EDWIN A. LATHROP,
CHARLES BRONK.